United States Patent
Liao et al.

(10) Patent No.: US 8,615,048 B2
(45) Date of Patent: Dec. 24, 2013

(54) CHANNEL ESTIMATION METHOD AND AN ASSOCIATED APPARATUS

(75) Inventors: Yi-Ying Liao, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 425 days.

(21) Appl. No.: 12/834,491

(22) Filed: Jul. 12, 2010

(65) Prior Publication Data
US 2011/0026620 A1  Feb. 3, 2011

(30) Foreign Application Priority Data
Jul. 31, 2009 (TW) .............................. 98125837 A (51) Int. Cl.
*H04L 27/28* (2006.01)
(52) U.S. Cl.
USPC ....................................................... 375/260
(58) Field of Classification Search
USPC .......... 370/210, 334; 375/219, 222, 229, 260, 375/267, 287, 299, 295, 316, 346
See application file for complete search history.

(56) References Cited

U.S. PATENT DOCUMENTS

| | | | |
|---|---|---|---|
| 7,058,134 B2* | 6/2006 | Sampath | 375/260 |
| 2005/0265490 A1* | 12/2005 | Sestok et al. | 375/340 |
| 2007/0217490 A1* | 9/2007 | Blake et al. | 375/222 |
| 2008/0192846 A1* | 8/2008 | Bjerke et al. | 375/260 |
| 2009/0129493 A1* | 5/2009 | Zhang et al. | 375/260 |
| 2009/0285315 A1* | 11/2009 | Wu | 375/260 |
| 2011/0096853 A1* | 4/2011 | Jayaraman et al. | 375/260 |

* cited by examiner

*Primary Examiner* — Sam K Ahn
*Assistant Examiner* — Shawkat M Ali
(74) *Attorney, Agent, or Firm* — WPAT, PC; Justin King (57) ABSTRACT

A channel estimation method, applied to an orthogonal frequency comprises performing a first number of sampling points inverse fast Fourier transformation (IFFT) operation on a preliminary frequency-domain channel response having a second number of response values to generate a first time-domain channel impulse response (CIR), the second number being greater than the first number; performing a time-domain windowing operation on the first time-domain CIR to generate a second time-domain CIR; performing a smoothing operation on a plurality of second time-domain CIRs of successive time points to generate a smooth time-domain CIR; and performing FFT operation on the smooth time-domain CIR to generate a frequency-domain channel response.

15 Claims, 10 Drawing Sheets

CHANNEL ESTIMATION METHOD AND AN ASSOCIATED APPARATUS

CROSS REFERENCE TO RELATED PATENT APPLICATION

This patent application is based on Taiwan, R.O.C. patent application No. 098125837 filed on Jul. 31, 2009.

FIELD OF THE INVENTION

The present invention relates to the channel estimation technology, and more particularly, to a channel estimation method and apparatus applied to an orthogonal frequency division multiplexing (OFDM) communication system.

BACKGROUND OF THE INVENTION

In a wireless communication system, the inter-symbol interference (ISI) exists in received signals due to the common multi-path fading effect. To remove the ISI, a receiver is generally provided with an equalizer that needs information of channel impulse response (CIR) to operate, and therefore estimation of the CIR plays an important character in a mobile radio system.

In addition, OFDM, an important communication technology in the wireless communication field, is mainly for increasing the data transmission rate. For example, the data transmission rate in IEEE 802.11a using the OFDM technology reaches up to 54 Mbps, compared to the transmission rate of only 11 Mbps in IEEE 802.11b without the OFDM technology. Therefore, it is an important subject as how to effectively estimate CIR of an OFDM system to remove ISI, so as to fully exert a characteristic of high transmission rate of the OFDM technology. In the OFDM system, channel estimation, i.e., CIR estimation, is normally realized via pilot symbols that are known to a transmitter and a receiver.

Figure 1:
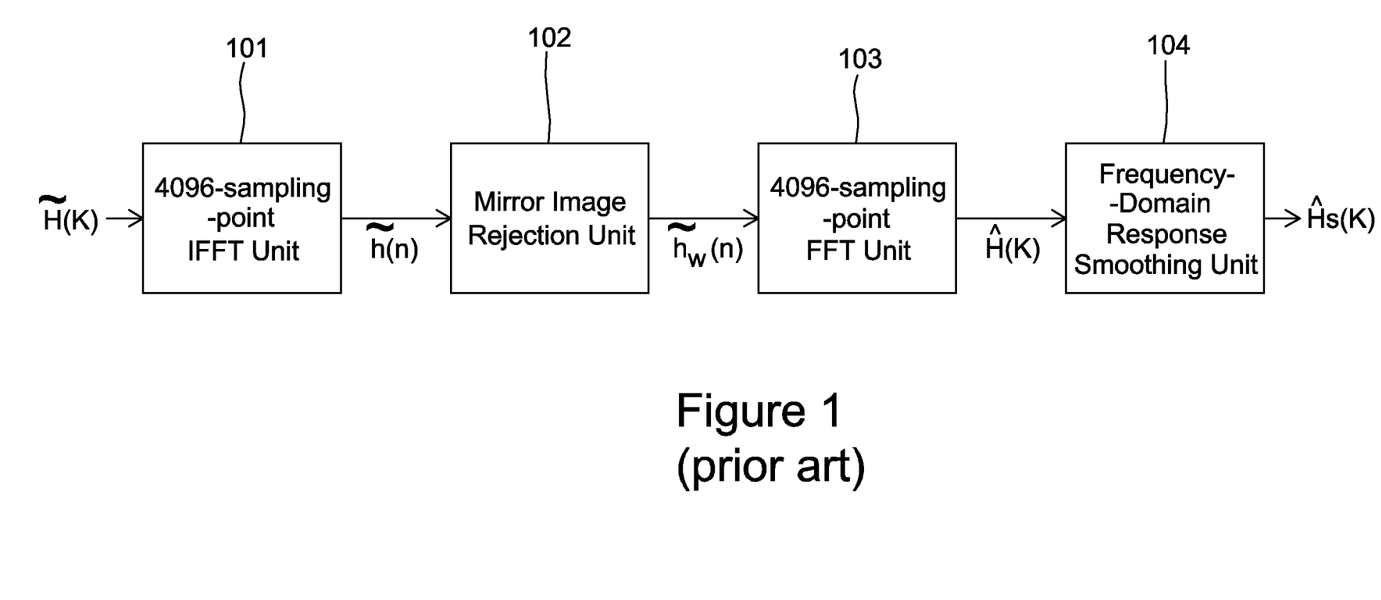
FIG. 1 is a block diagram of a conventional OFDM channel estimation apparatus.

Refer to FIG. 1 showing a block diagram of a conventional OFDM channel estimation apparatus comprising a 4096-sampling-point inverse fast Fourier transformation (IFFT) unit 101, a mirror image rejection unit 102, a 4096-sampling-point fast Fourier transformation (FFT) unit 103, and a frequency-domain response smoothing unit 104.

Figure 2:
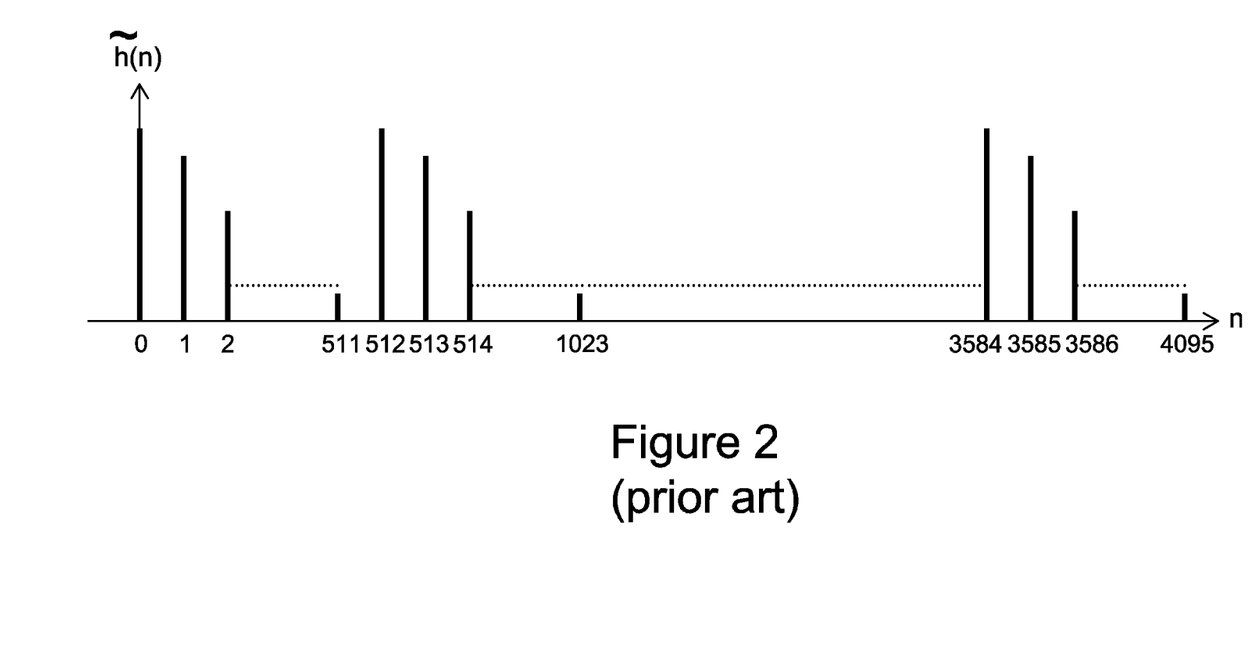
FIG. 2 is a schematic diagram of a time-domain CIR generated by performing IFFT operation by the conventional OFDM channel estimation apparatus illustrated in FIG. 1.
Figure 3:
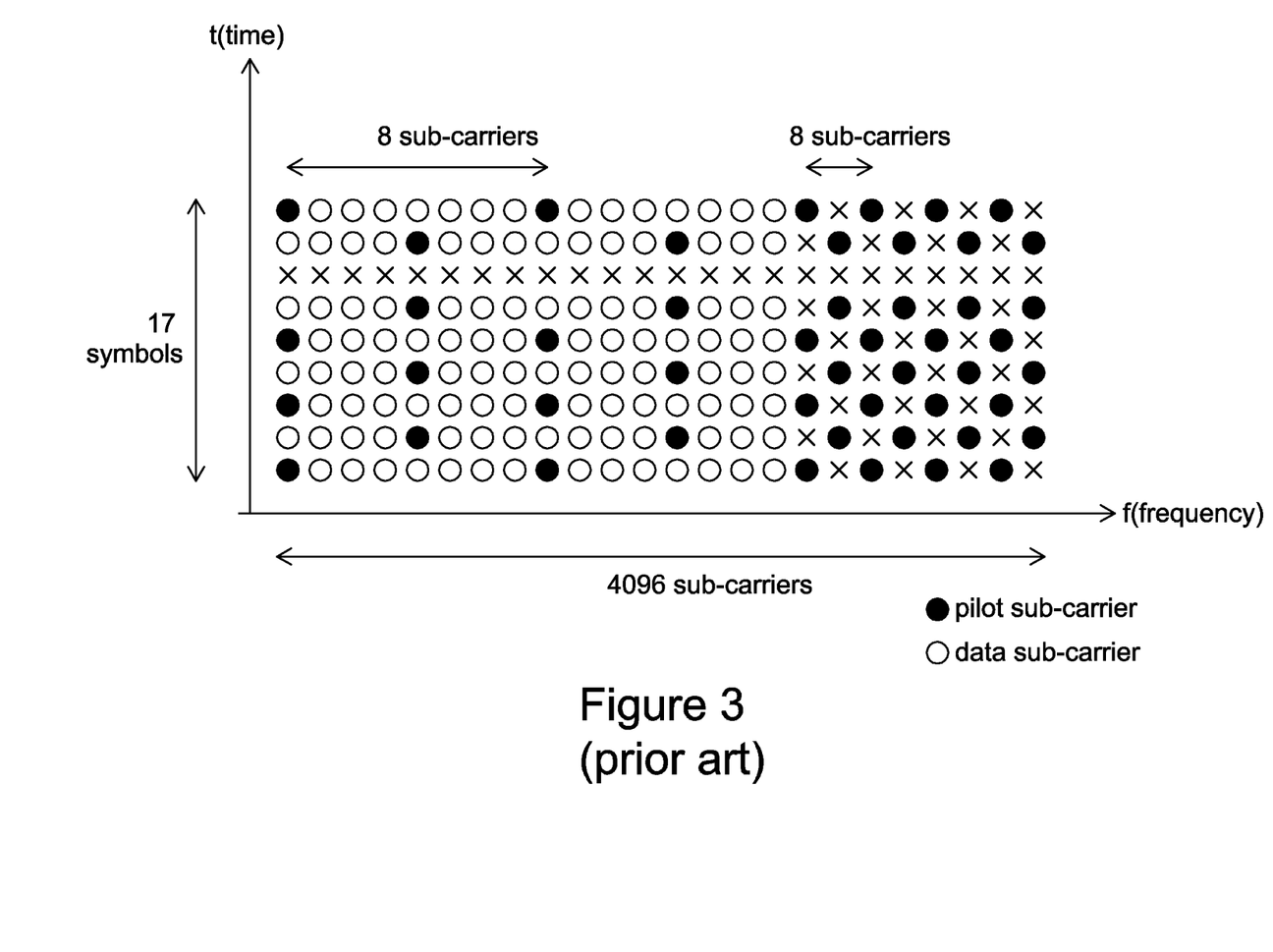
FIG. 3 is a schematic diagram of a pilot sampling distribution of a conventional CMMB OFDM preliminary frequency-domain channel response in time-frequency plane.

The 4096-sampling-point IFFT unit 101 performs 4096-sampling-point IFFT operation on a preliminary frequency channel response $\tilde{H}(k)$ to generate a time-domain CIR $\tilde{h}(n)$. Refer to FIG. 2 showing a frequency and time distribution comprising 4096 symbols $\tilde{h}(0), \tilde{h}(1), \tilde{h}(2), \ldots, \tilde{h}(4095)$. The conventional OFDM channel comprises 4096 sub-carriers, of which one in every 8 sub-carriers comprises a pilot sub-carrier for carrying a pilot symbol, and the remaining sub-carriers (other than the pilot sub-carriers) referred to as data sub-carriers are for carrying data symbols. That is, in the 4096 sub-carriers, there are 512 pilot sub-carriers for carrying pilot symbols, and there are 3584 data sub-carriers for carrying data symbols. FIG. 3 shows a time-frequency plane of 17×4096 symbols transmitted in a conventional OFDM channel. Estimation of a preliminary frequency-domain channel response $\tilde{H}(k)$ is obtained by performing the least square difference algorithm on a frequency-domain transmitting value and a frequency-domain receiving value of a pilot symbol. That is, the preliminary frequency-domain channel response $\tilde{H}(k)$ only has algorithm values at a frequency k corresponding to pilot sub-carries, and frequency channel response values corresponding to the remaining data sub-carriers are equal to zero. The 512 pilot symbols in the 4096 sub-carriers are distributed in two types, an even type and an odd type, alternatively. Please refer to FIG. 3, the even type is the horizontal row with a leading black circle as the following:

●○○○○○○○●○○○○○○○●x●x●x●x, and the odd type is the horizontal row with a leading while circle as the following:

○○○○●○○○○○○○●○○○x●x●x●x●.

The black circle ● represents pilot symbols. Pilot sub-carriers corresponding to the pilot symbols are at positions 0, 8, 16, 24 . . . 4088 in the even type and 4, 12, 20, 28 . . . 4092 in the odd type. The while circle ○ represents data symbols, and the mark x represents repeating symbols as the left side. Therefore, the preliminary frequency-domain channel response $\tilde{H}(k)$ may be an even frequency-domain channel response or an odd frequency-domain channel response according to the distribution of pilot symbols in 4096 sub-carriers. The even frequency-domain channel response and the odd frequency-domain channel response are alternatively transmitted to the 4096-sampling-point IFFT unit 101.

The mirror image rejection unit 102 maintains first and last 256 time-domain CIR values of the 4096 time-domain CIR $\tilde{h}(n)$, and filters the mirror image signals, i.e., the remaining 3584 time-domain CIR values, to generate a time-domain CIR $\tilde{h}_w(n)$ as:

$$\tilde{h}_w(n) = \begin{cases} \tilde{h}(n), & n = [0, 255] \cup [3840, 4095] \\ 0, & n = [256, 3839] \end{cases}$$

The FFT unit 103 performs 4096-sampling-point FFT operation on the time-domain CIR $\tilde{h}_w(n)$ to generate a frequency-domain channel response $\hat{H}(k)$, where k is equal to 0 to 4095.

The frequency-domain response smoothing unit 104 performs arithmetic averaging operation according to 17 groups of the frequency-domain channel responses, i.e., $\hat{H}_1(k)$, $\hat{H}_2(k), \ldots, \hat{H}_{17}(k)$, to generate a re-estimated frequency-domain channel response $\hat{H}_S(k)$ represented by:

$$\hat{H}_S(k) = \frac{1}{17}(\hat{H}_1(k), \hat{H}_2(k), \ldots, \hat{H}_{17}(k)),$$

where k is equal to 0 to 4095.

In the conventional OFDM channel estimation apparatus, only 512 sampling values of the 4096-sampling-point IFFT operation are non-zero, and others are equal to zero. Therefore, the 4096 IFFT operation is in fact large in scale that lacks of efficiency and needs to be improved. According to the present invention, a low-cost solution for reducing IFFT operation scale according to characteristics of China multimedia mobile broadcasting (CMMB) OFDM systems is provided to maintain a same channel estimation efficiency as when the operation scale is small.

In view of the problem, a novel algorithm for channel estimation is provided by the invention. The algorithm implements smaller scale IFFT operation to adaptively adjust operation formulas for processing the preliminary frequency-domain channel response to reach the same performance, so as to significantly reduce the overall operation scale.

SUMMARY OF THE INVENTION

One object of the present invention is to provide a channel estimation method having low cost and low power consumption to adaptively estimate CIR to be provided to a receiver for performing compensation.

Another object of the present invention is to provide a channel estimation apparatus having low cost and low power consumption to adaptively estimate CIR to be provided to a receiver for performing compensation.

Yet another object of the present invention is to provide a low operation complexity channel estimation solution capable of adaptively adjusting operation formulas according to sampling types of the preliminary frequency-domain channel response, so as to complete CIR estimation using IFFT operation of a smaller scale.

In order to achieve the foregoing objects, a channel estimation method, applied to an orthogonal frequency division multiplexing (OFDM) communication system, is provided in the invention. The method comprises performing a first number of sampling points inverse fast Fourier transformation (IFFT) operation on a preliminary frequency-domain channel response having a second number of response values to generate a first time-domain channel impulse response (CIR), the second number being greater than the first number; performing a time-domain windowing operation on the first time-domain CIR to generate a second time-domain CIR; performing a smoothing operation on a plurality of second time-domain CIRs of successive time points to generate a smooth time-domain CIR; and performing FFT operation on the smooth time-domain CIR to generate a frequency-domain channel response.

In order to achieve the foregoing objects, a channel estimation apparatus, applied to an OFDM system, is disclosed in the invention. The channel estimation apparatus comprises an IFFT unit, for performing a second number of sampling points IFFT on a preliminary frequency-domain channel response having a first number of response values to generate a first time-domain CIR, the second number being greater than the first number; a windowing unit, for performing time-domain windowing on the first time-domain CIR to generate a second time-domain CIR; a smoothing unit, for performing smoothing operation on a plurality of groups of second time-domain CIRs of successive time points to generate a smooth time-domain CIR; and a FFT unit, for performing a first number of sampling points FFT operation on the smooth time-domain CIR to generate a frequency-domain channel response.

Following description and figures are disclosed to gain a better understanding of the advantages of the present invention.

DETAILED DESCRIPTION OF THE PREFERRED EMBODIMENT

Figure 4:
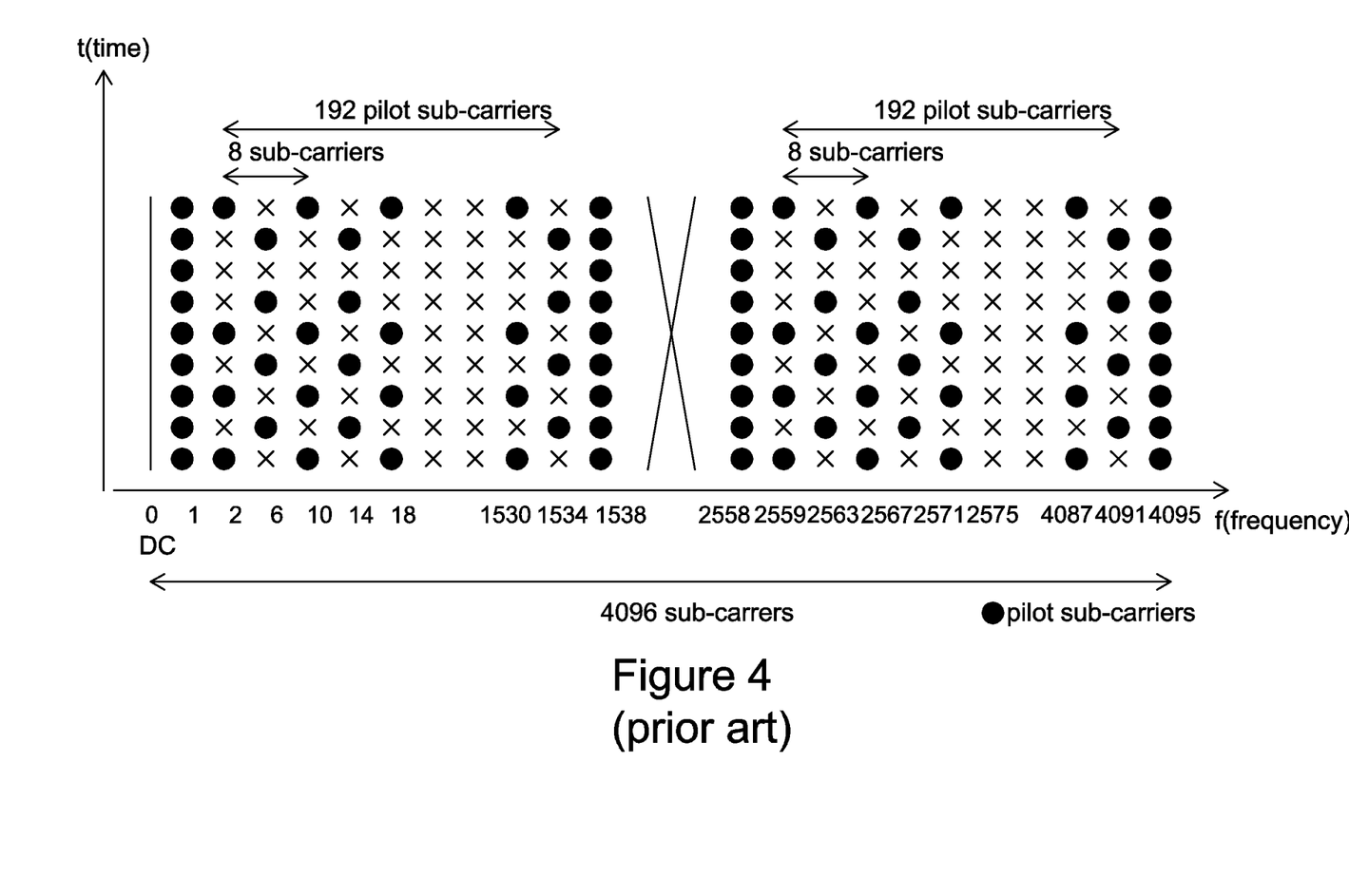
FIG. 4 is a schematic diagram of pilot symbol distribution of a CMMB OFDM system in accordance with an embodiment of the present invention.

Refer to FIG. 4 showing a schematic diagram of pilot symbol distribution of a CMMB OFDM system In a CMMB OFDM system, a guard band is provided among the 4096 sub-carriers, and sub-carriers within the guard band are not utilized to avoid the signal interference. Therefore, only 192×2 of pilot sub-carriers are actually utilized and distributed within two inconsecutive intervals. In addition, two (i.e., an even type and an odd type) pilot symbol distributions of the CMMB OFDM system are alternately arranged in the time axis. Accordingly, 4096-sampling-point IFFT operation of a preliminary frequency-domain channel response $\tilde{H}(k)$ is simplified below.

An even type operation formula is:

$$\tilde{h}(n) = \sum_{k=0}^{4095} \tilde{H}(k) e^{j\frac{2\pi nk}{4096}}$$

$$= \sum_{\substack{k=8m+2 \\ m \in [0,191]}} \tilde{H}(k) e^{j\frac{2\pi nk}{4096}} + \sum_{\substack{k=8m+1536+1020+3 \\ m \in [0,191]}} \tilde{H}(k) e^{j\frac{2\pi nk}{4096}}$$

$$= \sum_{m=0}^{191} \tilde{H}(8m+2) e^{j\frac{2\pi n(8m+2)}{4096}} +$$

$$\sum_{m=0}^{191} \tilde{H}(8m+1536+1020+3) e^{j\frac{2\pi n(8m+1536+1020+3)}{4096}}$$

$$= e^{j\frac{2\pi n(2)}{4096}} \left[ \sum_{m=0}^{191} \tilde{H}(8m+2) e^{j\frac{2\pi nm}{512}} \right] + e^{j\frac{2\pi n(1536+1020+3)}{4096}}$$

$$\left[ \sum_{m=0}^{191} \tilde{H}(8m+1536+1020+3) e^{j\frac{2\pi nm}{512}} \right]$$

$$= e^{j\frac{2\pi n(2)}{4096}} \left[ \sum_{m=0}^{511} A(m) e^{j\frac{2\pi nm}{512}} \right] +$$

$$e^{j\frac{2\pi n(1536+1020+3)}{4096}} \left[ \sum_{m=0}^{511} B(m) e^{j\frac{2\pi nm}{512}} \right] \text{ where}$$

$$A(m) = \begin{cases} \tilde{H}(8m+2), & m = 0 \sim 191 \\ 0, & m = 192 \sim 511, \end{cases}$$

$$B(m) = \begin{cases} \tilde{H}(8m+1536+1020+3), & m = 0 \sim 191 \\ 0, & m = 192 \sim 511. \end{cases}$$

These two groups, each having 192 pilot sub-carriers, are distributed within intervals of n∈[0,255] and n∈[3840,4095], and $\tilde{h}(n)$ is calculated with respect to the two intervals.

An odd type operation formula is:

$$\tilde{h}(n) = \sum_{k=0}^{4095} \tilde{H}(k)e^{j\frac{2\pi nk}{4096}}$$

$$= \sum_{\substack{k=8m+6 \\ m\in[0,191]}} \tilde{H}(k)e^{j\frac{2\pi nk}{4096}} + \sum_{\substack{k=8m+1536+1020+7 \\ m\in[0,191]}} \tilde{H}(k)e^{j\frac{2\pi nk}{4096}}$$

$$= \sum_{m=0}^{191} \tilde{H}(8m+6)e^{j\frac{2\pi n(8m+6)}{4096}} +$$

$$\sum_{m=0}^{191} \tilde{H}(8m+1536+1020+7)e^{j\frac{2\pi n(8m+1536+1020+7)}{4096}}$$

$$= e^{j\frac{2\pi n(6)}{4096}}\left[\sum_{m=0}^{191} \tilde{H}(8m+6)e^{j\frac{2\pi nm}{512}}\right] + e^{j\frac{2\pi n(1536+1020+7)}{4096}}$$

$$\left[\sum_{m=0}^{191} \tilde{H}(8m+1536+1020+7)e^{j\frac{2\pi nm}{512}}\right]$$

$$= e^{j\frac{2\pi n(6)}{4096}}\left[\sum_{m=0}^{511} A(m)e^{j\frac{2\pi nm}{512}}\right] +$$

$$e^{j\frac{2\pi n(1536+1020+7)}{4096}}\left[\sum_{m=0}^{511} B(m)e^{j\frac{2\pi nm}{512}}\right] \text{ where }$$

$$A(m) = \begin{cases} \tilde{H}(8m+6), & m = 0 \sim 191 \\ 0, & m = 192 \sim 511, \end{cases}$$

$$B(m) = \begin{cases} \tilde{H}(8m+1536+1020+7), & m = 0 \sim 191 \\ 0, & m = 192 \sim 511. \end{cases}$$

In the invention, the 512-sampling-point IFFT, replaced to the 4096-sampling-point IFFT in the prior art, is used to process 512 sampling points within intervals of n∈[0,255] and n∈[3840,4095]. And that time-domain CIR values outside intervals of n∈[0,255] and n∈[3840,4095] are filtered as mirror image signals after the IFFT operation is performed.

Figure 5:
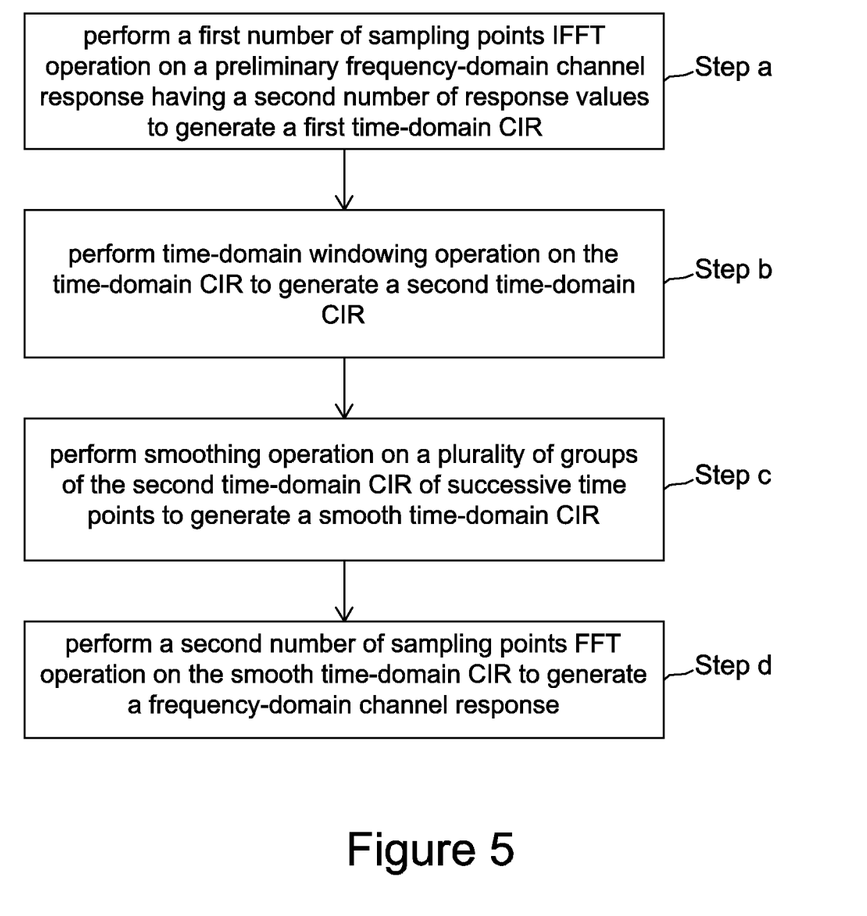
FIG. 5 is a flow chart of a channel estimation method in accordance with an embodiment of the present invention.

According to the foregoing formulas, the invention is able to provide a channel estimation method capable of substantially reducing the circuit cost. Refer to FIG. 5 showing a flow chart of a channel estimation method in accordance with an embodiment of the present invention. The method comprises generating a first time-domain CIR $\tilde{h}(n)$ by performing a first number of sampling points IFFT operation on a preliminary frequency-domain channel response $\tilde{H}(k)$ having a second number of response values (Step a); performing time-domain windowing operation on the time-domain CIR $\tilde{h}(n)$ to generate a second time-domain CIR $\tilde{h}_w(n)$ (Step b); performing smoothing operation on a plurality of groups of the second time-domain CIR $\tilde{h}_w(n)$ of successive time points to generate a smooth time-domain CIR $\hat{h}_s(n)$(Step c); and performing a third number of sampling points FFT operation on the smooth time-domain CIR $\hat{h}_s(n)$ to generate a frequency-domain channel response $\hat{H}_s(k)$ (Step d). The foregoing steps are described below in detail.

In Step a, the first number of sampling points IFFT operation is performed on the preliminary frequency-domain channel response $\tilde{H}(k)$ having the second number of response values to generate the first time-domain CIR $\tilde{h}(n)$. In the preferred embodiment, it is obtained that the 512-sampling-point IFFT operation achieves a same effect as using 4096-sampling-point IFFT, and thus the first number is 512 and the second number is 4096. The 512-sampling-point IFFT operation can be showed as the even type formula and the odd type formula. The even type formula has non-zero sampling values at 384 sampling points where k=8m+2, k=8m+2599, and m=0~191, and sampling values at the remaining sampling points are zero. The odd type formula has non-zero sampling values at 384 sampling points where k=8m+6, k=8m+2563, and m=0~191, and sampling values at the remaining sampling points are zero. The first number of sampling points IFFT operation comprises $$\sum_{m=0}^{511} A(m)e^{j\frac{2\pi nm}{512}}$$

part and $$\sum_{m=0}^{511} B(m)e^{j\frac{2\pi nm}{512}}$$

part, and 512 sampling values are $$A(m) = \begin{cases} \tilde{H}(8m+2), & m = 0 \sim 191 \\ 0, & m = 192 \sim 511 \end{cases} \text{ (the even type),}$$

$$B(m) = \begin{cases} \tilde{H}(8m+1536+1020+3), & m = 0 \sim 191 \\ 0, & m = 192 \sim 511 \end{cases} \text{ (the even type); or}$$

$$A(m) = \begin{cases} \tilde{H}(8m+6), & m = 0 \sim 191 \\ 0, & m = 192 \sim 511 \end{cases} \text{ (the odd type),}$$

$$B(m) = \begin{cases} \tilde{H}(8m+1536+1020+7), & m = 0 \sim 191 \\ 0, & m = 192 \sim 511 \end{cases} \text{ (the odd type).}$$

That is, the sampling values are non-zero when m is between 0 to 191 and are equal to zero when m is between 192 to 511. Therefore, the 512-sampling-point IFFT operation is performed only on 512 sampling points within intervals of n∈[0, 255] and n∈[3840,4095], and the response values of other 3584 sampling points outside intervals of n∈[0,255] and n∈[3840,4095] and are filtered as mirror image signals after the IFFT operation.

Figure 6:
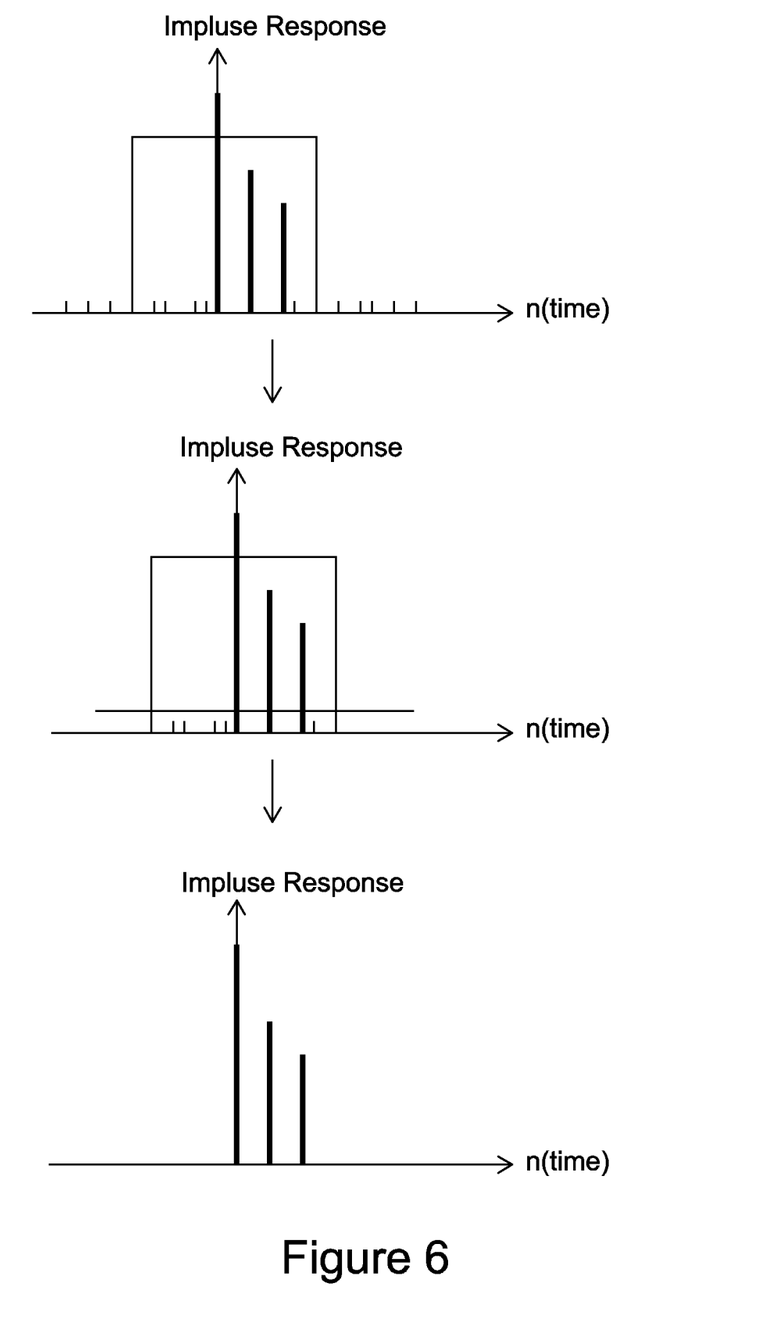
FIG. 6 is a schematic diagram of a time-domain windowing flow in accordance with an embodiment of the present invention.

In Step b, the time-domain windowing operation is performed on the first time-domain CIR $\tilde{h}(n)$ to generate the second time-domain CIR $\tilde{h}_w(n)$. The time-domain windowing operation is used for filtering out noises. Referring to FIG. 6, the time-domain windowing operation filters the sampling points of the first time-domain CIR $\tilde{h}(n)$ not in the window and lower than the threshold value to generate the second time-domain CIR $\tilde{h}_w(n)$. The length of the window is decided by a function of echo delay and is associated with multi-path signals, and the threshold value is a weighted value of time-domain CIR values within the window.

In Step c, the smoothing operation is performed on a plurality of groups of the second time-domain CIR $\tilde{h}_w(n)$ distributed in successive time points to generate a smooth time-domain CIR $\hat{h}_s(n)$. In this embodiment, 17 groups of the second time-domain CIRs of successive time points include a present second time-domain CIR, and 8 groups of CIRs respective before and after the time of the present second time-domain CIR in the time axis. The smoothing operation is a weighted average operation. That is, in Step c, the smoothing operation is performed on the 17 groups of the second time-domain CIR $\tilde{h}_w(n)$ to respectively generate 512 response values within intervals of n∈[0,255] and n∈[3840,4095], and the remaining 3584 response values within an interval of n∈[256,3839] are assigned to zero, so as to generate a smooth 4096-points time-domain CIR $\hat{h}_s(n)$. In particular, when the weighted average operation may be described as:

when $n \in [0, 255]$ or $n \in [3840, 4095]$, $$\hat{h}_S(n) = \frac{1}{17}(\tilde{h}_{w1}(n), \tilde{h}_{w2}(n), \ldots, \tilde{h}_{w17}(n));$$

when $n \in [256, 3839]$, $\hat{h}_s(n) = 0$.

When the weighted average operation is implemented, channel variation in the time axis is taken into consideration to determine weight values. When the channel dramatically changes in the time axis, a weight value of the present second time-domain CIR is bigger and weight values of the CIRs before and after the time of the present second time-domain CIR are smaller, so that weight values of the second time-domain CIRs far from the present time are decreased. Accordingly, by weighted averaging the second time-domain CIRs with the weight values, the smooth time-domain CIR $\hat{h}_s(n)$ having response values at 512 points within intervals of n∈[0, 255] and n∈[3840,4095] and zero at 3584 points within the interval of n∈[256,3839] is generated.

In Step d, the third number of sampling points FFT operation is performed on the smooth time-domain CIR $\hat{h}_s(n)$ to generate a frequency-domain channel response $\hat{H}_s(k)$. The third number is 4096, which is the same as the second number of the preliminary frequency-domain channel response $\tilde{H}(k)$, i.e., in Step d, the frequency-domain channel response value $\hat{H}_s(k)$ is generated at all sub-carriers with frequency k within 0 to 4095.

Compared to the prior art, the 512-sampling-point IFFT operation implemented according to the present invention, with proof demonstrated via the even type formula and the odd type formula, is capable of achieving the same effect as implementing 4096 IFFT sampling points. Therefore, according to the present invention, computing demands of the IFFT operation, the time-domain windowing and the smoothing operation are substantially reduced.

Figure 7:
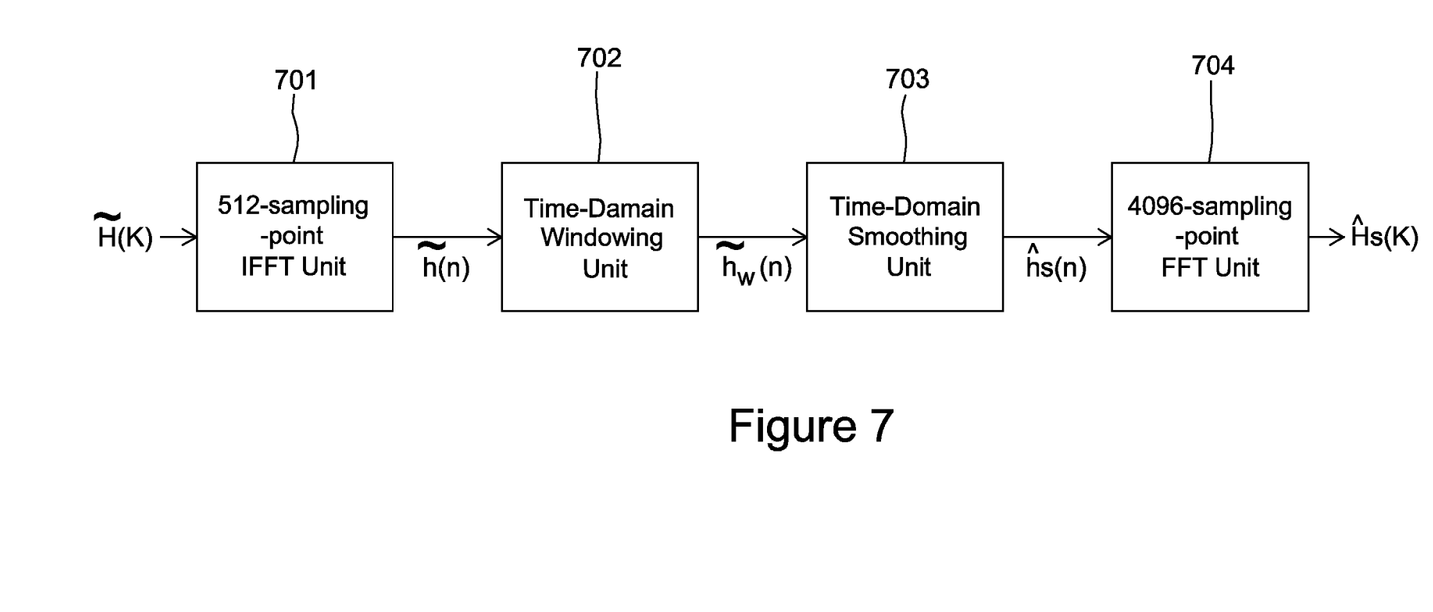
FIG. 7 is a block diagram of a channel estimation apparatus in accordance with an embodiment of the present invention.

Refer to FIG. 7 showing a block diagram of a channel estimation apparatus in accordance with an embodiment of the present invention. In this embodiment, the channel estimation apparatus comprises a 512-sampling-point IFFT unit 701, a time-domain windowing unit 702, a time-domain smoothing unit 703, and a 4096-sampling-point FFT unit 704.

The 512-sampling-point IFFT unit 701 performs 512-sampling-point IFFT operation on a preliminary frequency response $\tilde{H}(k)$ having 4096 response values according to the even type formula or the odd type formula to generate a first time-domain CIR $\tilde{h}(n)$. The even type formula only has non-zero sampling values at 384 sampling points (positions of pilot symbols) where k=8m+2, k=8m+2599, and m=0~191 and has sampling values of zero at the remaining sampling points. The odd type operation formula only has non-zero sampling values at 384 sampling points (positions of pilot symbols) where k=8m+6, k=8m+2563, and m=0~191 and has sampling values of zero at the remaining sampling points. The 512-sampling-point IFFT operation comprises $$\sum_{m=0}^{511} A(m) e^{j\frac{2\pi nm}{512}}$$

part and $$\sum_{m=0}^{511} B(m) e^{j\frac{2\pi nm}{512}}$$

part, and 512 sampling values are:

$$A(m) = \begin{cases} \tilde{H}(8m+2), & m = 0 \sim 191 \\ 0, & m = 192 \sim 511 \end{cases} \text{(even type)},$$

$$B(m) = \begin{cases} \tilde{H}(8m+1536+1020+3), & m = 0 \sim 191 \\ 0, & m = 192 \sim 511 \end{cases} \text{(even type); or}$$

$$A(m) = \begin{cases} \tilde{H}(8m+6), & m = 0 \sim 191 \\ 0, & m = 192 \sim 511 \end{cases} \text{(odd type)},$$

$$B(m) = \begin{cases} \tilde{H}(8m+1536+1020+7), & m = 0 \sim 191 \\ 0, & m = 192 \sim 511 \end{cases} \text{(odd type)}.$$

That is, the sampling values are non-zero when m=0 to 191, and the sampling values are equal to zero when m=192 to 511. For that time-domain CIRs outside intervals of n∈[0,255] and n∈[3840,4095] are mirror image signals to be filtered after the IFFT operation is performed, the 512-sampling-point IFFT operation is performed on 512 sampling points within intervals of n∈[0,255] and n∈[3840,4095] but not on the remaining 3584 sampling points.

The time-domain windowing unit 702 for removing noises from the first time-domain CIRs $\tilde{h}(n)$ according to a threshold value and a window length. The time-domain windowing unit 702 filters the sampling points of the first time-domain CIR $\tilde{h}(n)$ not in the window and lower than the threshold value to generate the second time-domain CIR $\tilde{h}_w(n)$. The length of the window is decided by a function of echo delay and is associated with multi-path signals, and the threshold value is a weighted value of time-domain CIR values within the window.

The time-domain smoothing unit 703 performs smoothing operation on a plurality of groups of the second time-domain CIR $\tilde{h}_w(n)$ distributed in successive time points to generate a smooth time-domain CIR $\hat{h}_s(n)$. In this embodiment, 17 groups of the second time-domain CIR of successive time points correspond to a present second time-domain CIR, and 8 groups of CIRs before and after the time point of the present second time-domain CIR in the time axis. The smoothing operation is a weighted average operation to respectively generate smooth response values within intervals of n∈[0, 255] and n∈[3840,4095], and the remaining 3584 response values within an interval of n∈[256,3839] assigned as zero, so as to generate a smooth 4096-point time-domain CIR $\hat{h}_s(n)$. In particular, when the weighted average operation is described as:

when $n \in [0, 255]$ or $n \in [3840, 4095]$, $$\hat{h}_S(n) = \frac{1}{17}(\tilde{h}_{w1}(n), \tilde{h}_{w2}(n), \ldots, \tilde{h}_{w17}(n));$$

when $n \in [256, 3839]$, $\hat{h}_s(n) = 0$.

When the weighted average operation is implemented, channel variation in the time axis is taken into consideration to determine a weight value. When the channel dramatically changes in the time axis, a weight value of the present second time-domain CIR is bigger and weight values of the CIRs before and after the time of the present second time-domain CIR are smaller, so that weight values of the second time-domain CIRs far from the present time are decreased. Accordingly, by weighted averaging the second time-domain CIRs with the weight values, the smooth time-domain CIR $\hat{h}_s(n)$ having response values at 512 points within intervals of $n \in [0, 255]$ and $n \in [3840, 4095]$ and zero at 3584 points within the interval of $n \in [256, 3839]$ is generated.

The 4096-sampling-point FFT unit 704 performs 4096-sampling-point FFT operation on the smooth time-domain CIR $\hat{h}_s(n)$ to generate a frequency-domain channel response $\hat{H}_s(k)$, which has frequency-domain channel response values at all sub-carriers with frequency k within 0 to 4095.

Figure 8:
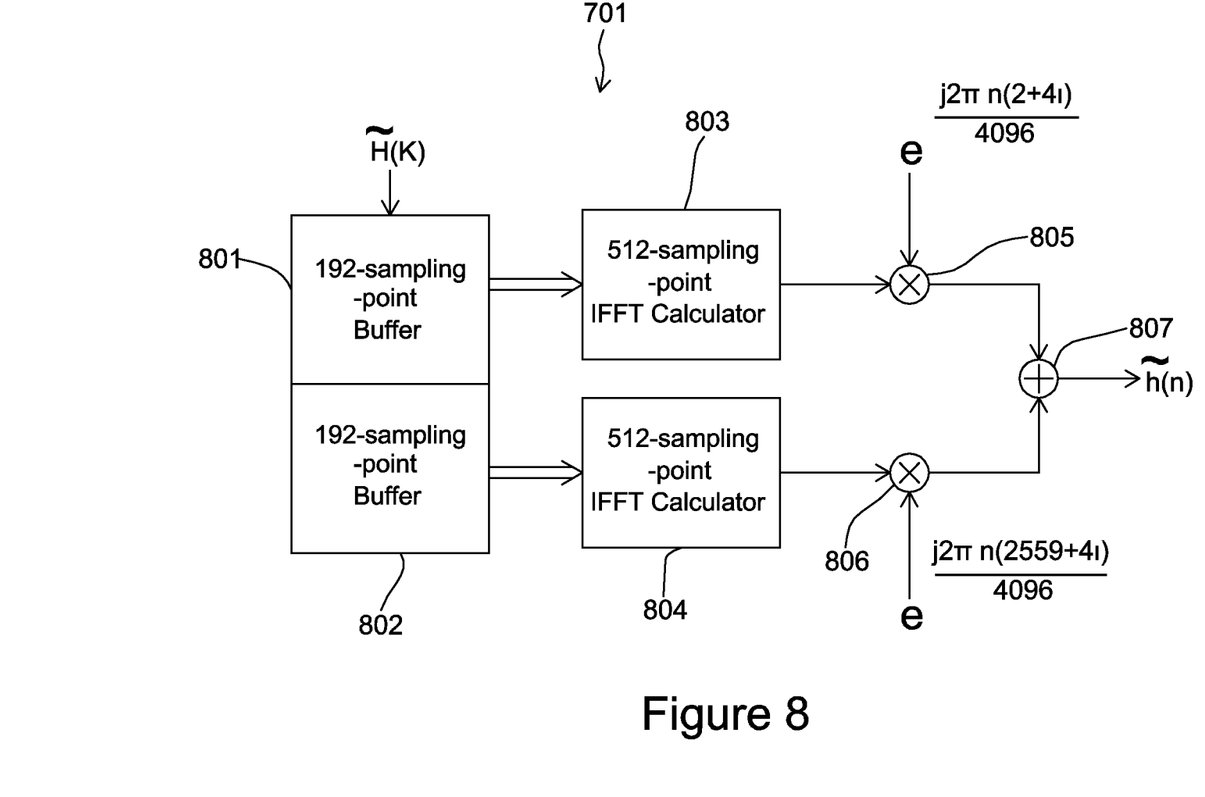
FIG. 8 is a block diagram of a 512-sampling-point IFFT unit illustrated in FIG. 7 in accordance with an embodiment of the present invention.

Refer to FIG. 8 showing a block diagram of the 512-sampling-point IFFT unit 701 illustrated in FIG. 7 in accordance with an embodiment of the present invention. In this embodiment, the IFFT unit 701 comprises two 192-sampling-point buffers 801 and 802, two 512-sampling-point IFFT calculators 803 and 804, two multipliers 805 and 806, and an adder 807.

The 192-sampling-point buffers 801 and 802 are for storing the preliminary frequency-domain channel responses $\tilde{H}(k)$. When sampling points of the preliminary frequency-domain channel response $\tilde{H}(k)$ are distributed in an even type, the 192-sampling-point buffers 801 and 802 respectively store the preliminary frequency-domain channel response, $A(m) = \tilde{H}(8m+2)$, $m = 0 \sim 191$ and $B(m) = \tilde{H}(8m+1536+1020+3)$, $m = 0 \sim 191$, in two inconsecutive ranges. When the sampling points of the preliminary frequency-domain channel responses $\tilde{H}(k)$ are distributed in an odd type, the 192-sampling-point buffers 801 and 802 respectively store the preliminary frequency-domain channel response, $A(m) = \tilde{H}(8m+6)$, $m = 0 \sim 191$ and $B(m) = \tilde{H}(8m+1536+1020+7)$, $m = 0 \sim 191$ in two inconsecutive ranges.

The 512-sampling-point IFFT calculator 803, coupled to the 192-sampling-point buffer 801, performs first IFFT operation on 512 sampling points to generate a first IFFT values $$\sum_{m=0}^{511} A(m) e^{j\frac{2\pi nm}{512}},$$

where $n \in [0, 255]$ or $n \in [3840, 4095]$.

The 512-sampling-point IFFT calculator 804, coupled to the 192-sampling-point buffer 802, performs second IFFT operation on 512 sampling points to generate a second IFFT values $$\sum_{m=0}^{511} B(m) e^{j\frac{2\pi nm}{512}},$$

where $n \in [0, 255]$ or $n \in [3840, 4095]$.

The multiplier 805 multiplies a first phase variable $e^{j2\pi n(2+4i)/4096}$ with the first IFFT value $$\sum_{m=0}^{511} A(m) e^{j\frac{2\pi nm}{512}}$$

to generate a first part of the first time-domain CIR. A parameter i of the first phase variable $e^{j2\pi n(2+4i)/4096}$ has two situations—i=0 means the even type, and i=1 means the odd type.

The multiplier 806 multiplies a second phase variable $e^{j2\pi n(2559+4i)/4096}$ with the second IFFT value $$\sum_{m=0}^{511} B(m) e^{j\frac{2\pi nm}{512}}$$

to generate a second part of the first time-domain CIR. A parameter i of the second phase variable $e^{j2\pi n(2+4i)/4096}$ has two situations—i=0 means the even type, and i=1 means the odd type.

The adder 807 integrates the first part of the first time-domain CIR and the second part of the first time-domain CIR to generate a first time-domain CIR $\tilde{h}(n)$.

Figure 9:
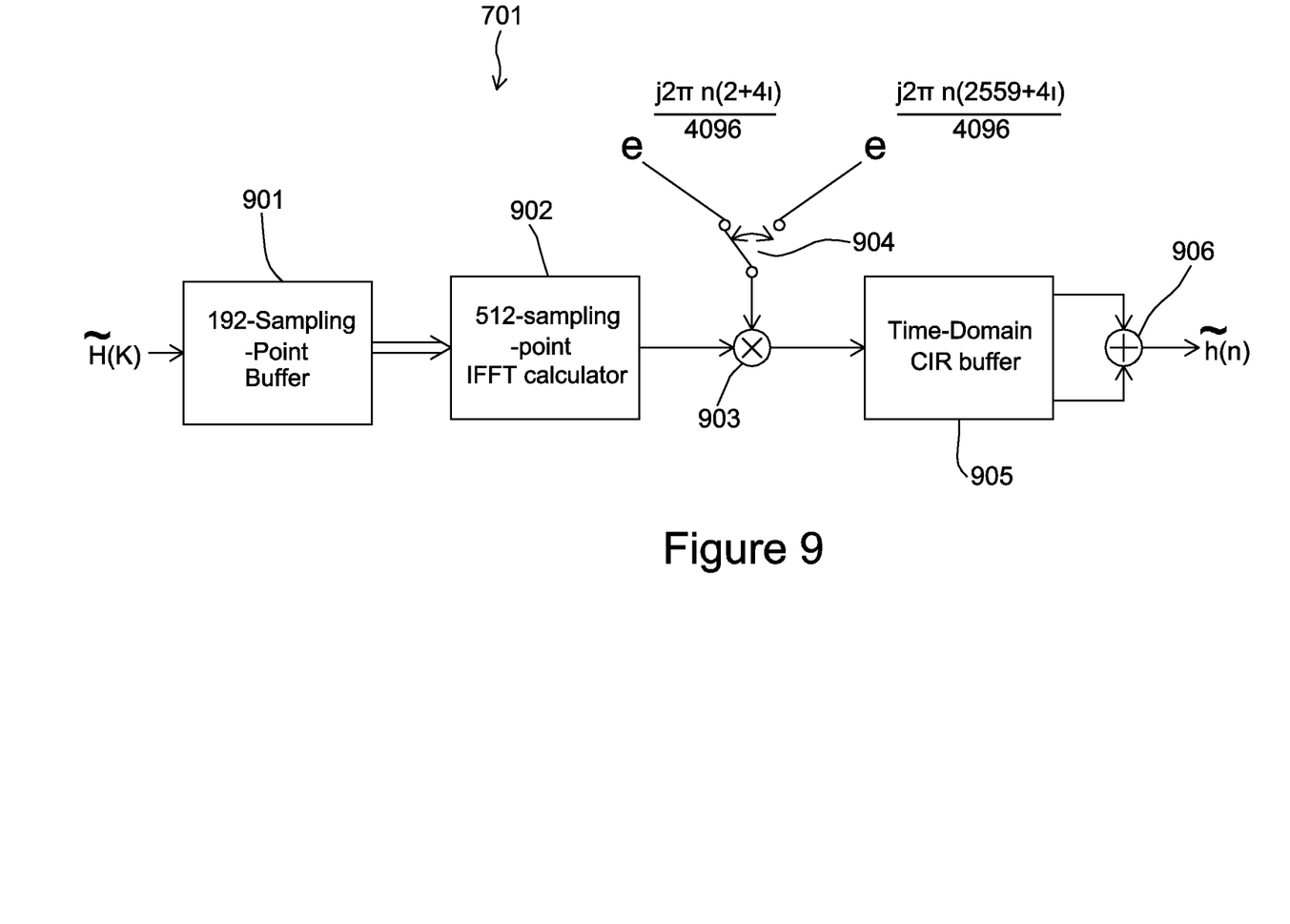
FIG. 9 is a block diagram of a 512-sampling-point IFFT unit illustrated in FIG. 7 in accordance with another embodiment of the present invention.

Refer to FIG. 9 showing a block diagram of the 512-sampling-point IFFT unit 701 illustrated in FIG. 7 in accordance with another embodiment of the present invention. In this embodiment, the 512-sampling-point IFFT unit 701 comprises a 192-sampling-point buffer 901, a 512-sampling-point IFFT calculator 902, a multiplier 903, a switch 904, a time-domain CIR buffer 905, and an adder 906.

The 192-sampling-point buffer 901 is for storing the preliminary frequency-domain channel response $\tilde{H}(k)$. When sampling points of the preliminary frequency-domain channel response $\tilde{H}(k)$ are distributed in an even type, the 192-sampling-point buffer 901 buffers $A(m) = \tilde{H}(8m+2)$, $m = 0 \sim 191$ and $B(m) = \tilde{H}(8m+1536+1020+3)$, $m = 0 \sim 191$ in sequence. When sampling points of the preliminary frequency-domain channel response $\tilde{H}(k)$ are distributed in an odd type, the 192-sampling-point buffer 901 buffers $A(m) = \tilde{H}(8m+6)$, $m = 0 \sim 191$ and $B(m) = \tilde{H}(8m+1536+1020+7)$, $m = 0 \sim 191$ in sequence. In this embodiment, the IFFT operation only needs to be completed before a next set of 192 preliminary frequency-domain channel responses is transmitted to the 192-sampling-point buffer 901, so that the 192-sampling-point buffer 901 is allowed to store each 192-sampling-point preliminary frequency-domain channel response values.

The 512-sampling-point IFFT calculator 902, coupled to the 192-sampling-point buffer 901, performs IFFT operation on 512 sampling points to generate an IFFT value $$\sum_{m=0}^{511} A(m) e^{j\frac{2\pi nm}{512}} \text{ or } \sum_{m=0}^{511} B(m) e^{j\frac{2\pi nm}{512}},$$

Where $n \in [0, 255]$ or $n \in [3840, 4095]$.

The multiplier 903 multiplies a phase variable $e^{j2\pi n(2+4i)/4096}$ (or $e^{j2\pi n(2559+4i)/4096}$) and the IFFT values $$\sum_{m=0}^{511} A(m) e^{j\frac{2\pi nm}{512}} \text{ or } \sum_{m=0}^{511} B(m) e^{j\frac{2\pi nm}{512}}$$

to generate a first part of the first time-domain CIR (or a second part of the first time-domain CIR).

The switch 904 is for selecting one phase variable from a first phase variable and a second phase variable. The first phase variable is $e^{j2\pi n(2+4i)/4096}$, where i=0 means the even type, and i=1 means the odd type. The second phase variable is $e^{j2\pi n(2559+4i)/4096}$, where i=0 means the even type and i=1 means the odd type.

The time-domain CIR buffer 905, coupled to the multiplier 903, is for storing a first part and a second part of the first time-domain CIR.

The adder 906 is for integrating the first part of the first time-domain CIR and the second part of the first of time-domain CIR to generate a first time-domain CIR $\tilde{h}(n)$.

Figure 10:
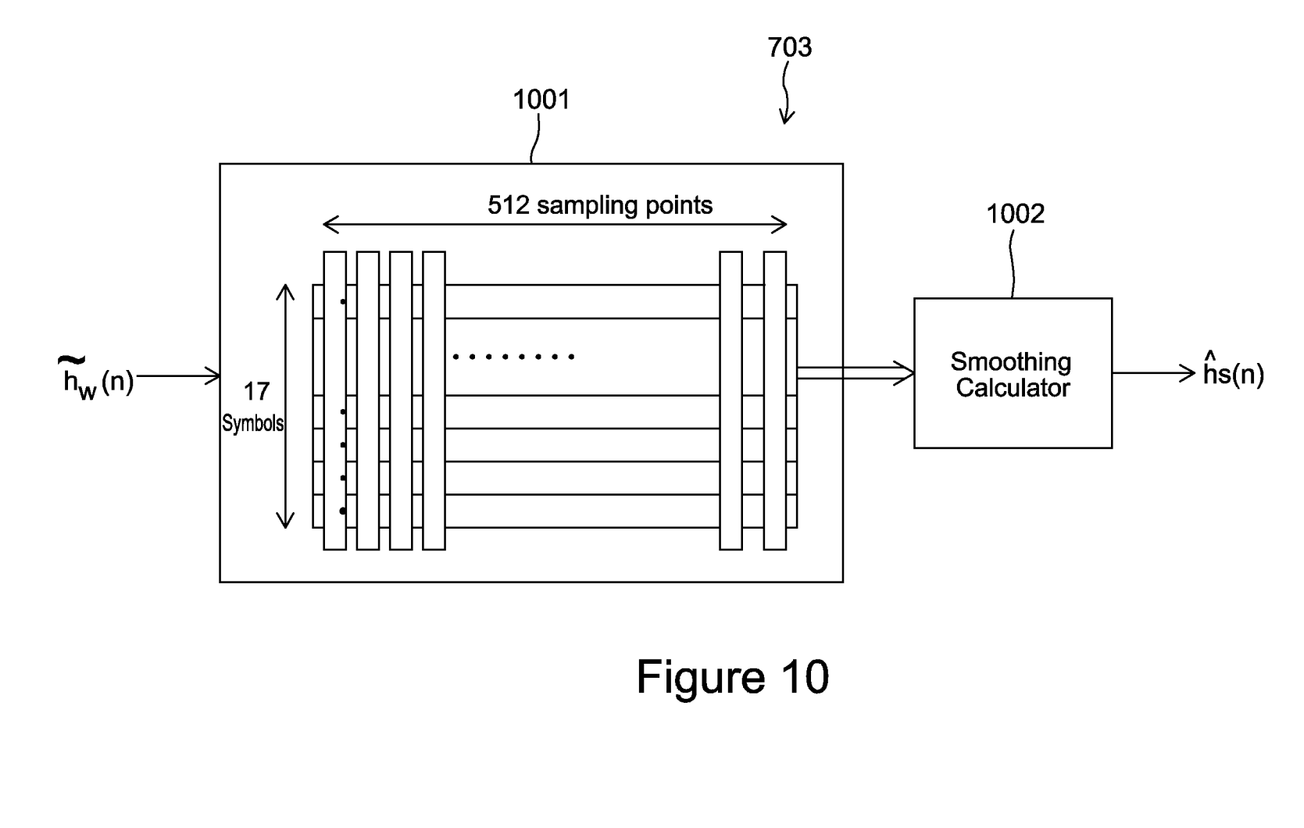
FIG. 10 is a block diagram of a time-domain CIR smoothing unit illustrated in FIG. 7 in accordance with an embodiment of the present invention.

Refer to FIG. 10 showing the time-domain CIR smoothing unit 703 illustrated in FIG. 7 in accordance with an embodiment of the present invention. In this embodiment, the time-domain CIR smoothing unit 703 comprises a time-domain CIR storage unit 1001 and a smoothing calculator 1002.

The time-domain CIR storage unit 1001 is for storing 17 groups of the second time-domain CIRs $\tilde{h}_{w1}(n), \tilde{h}_{w2}(n), \ldots, \tilde{h}_{w17}(n)$. The 17 groups include a present second time-domain CIR, and 8 groups before and after the time of the present second time-domain CIR. For that only 512-sampling-point IFFT operation is utilized, the time-domain CIR storage unit 1001 needs only storage space for 17*512 points and thus significantly reducing requirements of storage units.

The smooth calculator 1002, coupled to the time-domain CIR storage unit 1001, performs smoothing operation on the 17 groups of the second time-domain CIR $\tilde{h}_{w1}(n), \tilde{h}_{w2}(n), \ldots, \tilde{h}_{w17}(n)$. The smoothing operation implements weighted average operation to calculate 17 groups of the second time-domain CIR $\tilde{h}_w(n)$ so as to respectively generate response values of 512 sampling points within intervals of n∈[0,255] and n∈[3840,4095], and assigns zero as response values of other 3584 sampling points within an interval of n∈[256, 3839], so as to generate 4096 smooth time-domain CIR $\hat{h}_s(n)$. In particular, when the weighted average operation is implemented, following operations are performed.
when n∈[0,255] or n∈[3840,4095], $$\hat{h}_S(n) = \frac{1}{17}(\tilde{h}_{w1}(n), \tilde{h}_{w2}(n), \ldots, \tilde{h}_{w17}(n));$$

when n∈[256,3839], $\hat{h}_s(n)$=0, so as to generate the smooth time-domain CIR $\hat{h}_s(n)$. When the weighted average operation is implemented, channel variables in the time axis are taken into consideration to determine weight values. When the channel dramatically changes in the time axis, a weight value of the present second time-domain CIR is bigger and weight values of the CIRs before and after the time of the present second time-domain CIR are smaller, so that weight values of the second time-domain CIRs far from the present time are decreased. Accordingly, by weighted averaging the second time-domain CIRs with the weight values, the smooth time-domain CIR $\hat{h}_s(n)$ having response values at 512 points within intervals of n∈[0,255] and n∈[3840,4095] and zero at 3584 points within the interval of n∈[256,3839] is generated.

Therefore, according to the foregoing embodiments of the present invention, a channel estimation solution with low complexity, low cost and low power consumption is provided to overcome disadvantages of the prior art.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures. For example, modifications of arrangement patterns of pilot sub-carriers, sampling points, buffer size, the number of average groups, smoothing processing approaches are included within the spirit and scope of the appended claims.

What is claimed is:

1. A method, comprising: providing an orthogonal frequency division multiplexing (OFDM) communication system for performing and supplying a channel estimation to a receiver; performing a first number of sampling points inverse fast Fourier transformation (IFFT) operation on a preliminary frequency-domain channel response which processes only partial frequency-domain channel responses from pilot sub-channels to generate a plurality of first time-domain channel impulse responses (CIRs), wherein the preliminary frequency-domain channel response has a second number of response values, and the second number is greater than the first number; performing a time-domain windowing operation on the plurality of the first time-domain CIRs, for filtering out sampling points of the plurality of the first time-domain CIRs not in a window having a length defined as a function of echo delay, and are lower than a weighted value of time-domain CIRs within the window, to generate a plurality of second time-domain CIRs, wherein said echo delay is associated with multi-path signals; performing a smoothing operation on the plurality of the second time-domain CIRs of successive time points to generate a smooth time-domain CIRs, wherein the smoothing operation is a weighted average operation; and performing a fast Fourier transformation (FFT) operation on the smooth time-domain CIRs to generate a second frequency-domain channel response.

2. The method as claimed in claim 1, wherein the first number is 512 and the second number is 4096.

3. The method as claimed in claim 1, wherein the time-domain windowing operation filters the first time-domain CIRs not in a window and lower than a threshold value, a length of the window is a function of echo delay, and the threshold value is a weighted average value of the plurality of the first time-domain CIRs within the window.

4. An apparatus, comprising: an inverse fast Fourier transformation (IFFT) unit, for performing a first number of sampling points IFFT on a preliminary frequency-domain channel response which processes only partial frequency-domain channel responses from pilot sub-channels to generate a plurality of first time-domain channel impulse responses (CIRs), wherein the preliminary frequency-domain channel response has a second number of response values, and the second number is greater than the first number; a windowing unit, for performing time-domain windowing on the plurality of the first time-domain CIRs, filtering out sampling points of the plurality of the first time-domain CIRs not in a window having a length defined as a function of echo delay, and are lower than a weighted value of time-domain CIRs within the window, to generate a plurality of second time-domain CIRs, wherein said echo delay is associated with multi-path signals; a smoothing unit, for performing smoothing operation on the plurality of the second time-domain CIRs of successive time points to generate a smooth time-domain CIRs, wherein the smoothing operation is a weighted average operation; and a fast Fourier transformation (FFT) unit, for performing a third number of sampling points FFT operation on the smooth time-domain CIRs to generate a final frequency-domain channel response; wherein said apparatus is applied to an orthogonal frequency division multiplexing (OFDM) communication system for performing and providing a channel estimation to a receiver.

5. The apparatus as claimed in claim 4, wherein the first number is 512, the second number is 4096, and the third number is 4096.

6. The apparatus as claimed in claim 4, wherein the windowing unit filters the first time-domain CIRs not in a window and lower than a threshold value, a length of the window is a function of echo delay, and the threshold value is a weighted average value of the plurality of the first time-domain CIRs within the window.

7. The apparatus as claimed in claim 4, wherein the IFFT unit comprises: a first buffer for storing a first part of the preliminary frequency-domain channel response; a second buffer for storing a second part of the preliminary frequency-domain channel response; a first IFFT calculator, coupled to the first buffer, for generating a first IFFT response by performing a first IFFT operation having the first number of sampling points on the first part of the preliminary frequency-domain channel response; a first multiplier, for multiplying a first phase variable with the first IFFT response to generate a first part of the first time-domain CIRs; a second IFFT calculator, coupled to the second buffer, for generating a second IFFT response by performing a second IFFT operation having the first number of sampling points on the second part of the frequency-domain preliminary channel response; a second multiplier, for multiplying a second phase variable with the second IFFT response to generate a second part of the first time-domain CIRs; and an adder, for integrating the first part of the first time-domain CIRs and the second part of the first time-domain CIRs to generate the first time-domain CIRs.

8. The apparatus as claimed in claim 7, wherein the first buffer and the second buffer respectively buffer 192 sampling point response values of the preliminary frequency-domain channel response.

9. The apparatus as claimed in claim 8, wherein the first phase variable is $e^{j2\pi n(2+4i)/4096}$, where i equals to 0 when the preliminary frequency-domain channel response is an even type and i equals to 1 when the preliminary frequency-domain channel response is an odd type, wherein n∈[0,255] or n∈[3840,4095].

10. The apparatus as claimed in claim 8, wherein the second phase variable is $e^{j2\pi n(2559+4i)/4096}$, where i equals to 0 when the preliminary frequency-domain channel response is an even type and i equals to 1 when the preliminary frequency-domain channel response is an odd type, wherein n∈[0,255] or n∈[3840,4095].

11. The apparatus as claimed in claim 4, wherein the IFFT unit comprises: an input buffer, for buffering the preliminary frequency-domain channel response; an IFFT calculator, coupled to the input buffer, for generating an IFFT response by performing an IFFT operation having the first number of sampling points on the preliminary frequency-domain channel response; a switch, for selecting an output phase variable from a first phase variable and a second phase variable according to the channel response type; a multiplier, for multiplying the output phase variable and the IFFT response to generate a temporary time-domain CIR; a time-domain CIR buffer, coupled to the multiplier, for storing the temporary time-domain CIR comprising a first part of the first time-domain CIRs associated with the first phase variable and a second part of the first time-domain CIRs associated with the second phase variable; and an adder, for integrating the first part of the first time-domain CIRs and the second part of the first time-domain CIRs to generate the first time-domain CIRs.

12. The apparatus as claimed in claim 11, wherein the first number is 512 and the second number is 4096.

13. The apparatus as claimed in claim 11, wherein the first phase variable is $e^{j2\pi n(2+4i)/4096}$, where i equals to 0 when the preliminary frequency-domain channel response is an even type and i equals to 1 when the preliminary frequency-domain channel response is an odd type, wherein n∈[0,255] or n∈[3840,4095].

14. The apparatus as claimed in claim 11, wherein the second phase variable is $e^{j2\pi n(2559+4i)/4096}$ where i equals to 0 when the preliminary frequency-domain channel response is an even type and i equals to 1 when the preliminary frequency-domain channel response is an odd type, wherein of n∈[0,255] or n∈[3840,4095].

15. The apparatus as claimed in claim 4, wherein the smoothing unit comprises: a time-domain CIR storage unit, for storing the plurality of the second time-domain CIRs of successive time points; and a smoothing calculator, coupled to the time-domain CIR storage unit, for performing the smoothing operation on the plurality of the second time domain CIRs to generate the smooth time-domain CIRs.

* * * * *